No. 885,256. PATENTED APR. 21, 1908.
D. G. JONES.
FLEXIBLE PIPE UNION.
APPLICATION FILED FEB. 15, 1906.

WITNESSES:
J. P. Heffleman
Margaret Hughes

INVENTOR
David G. Jones
by W. G. Doolittle
ATTORNEY

UNITED STATES PATENT OFFICE.

DAVID GUY JONES, OF PITTSBURG, PENNSYLVANIA, ASSIGNOR TO BEST MANUFACTURING COMPANY, OF PITTSBURG, PENNSYLVANIA, A CORPORATION OF PENNSYLVANIA.

FLEXIBLE PIPE-UNION.

No. 885,256.     Specification of Letters Patent.     Patented April 21, 1908.

Application filed February 15, 1906. Serial No. 301,210.

*To all whom it may concern:*

Be it known that I, DAVID GUY JONES, a citizen of the United States, residing at Pittsburg, in the county of Allegheny and State of Pennsylvania, have invented new and useful Improvements in Flexible Pipe-Unions, of which the following is a specification.

The object of my invention is to provide a new and improved flexible pipe-union, and to this end my invention consists of a flexible pipe-union, in the novel features of construction, and in the combination of parts all as hereinafter described and claimed.

Figure 1:
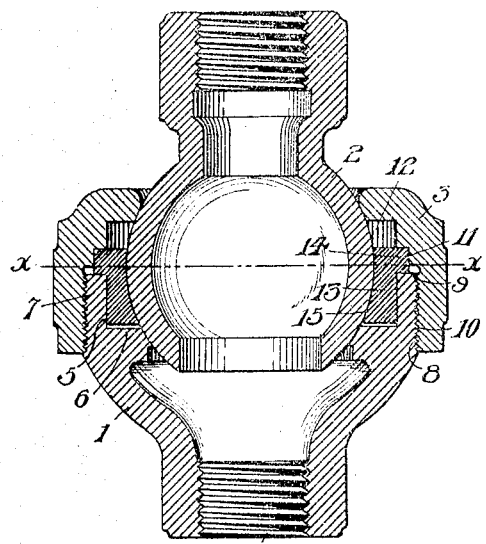
Figure 2:
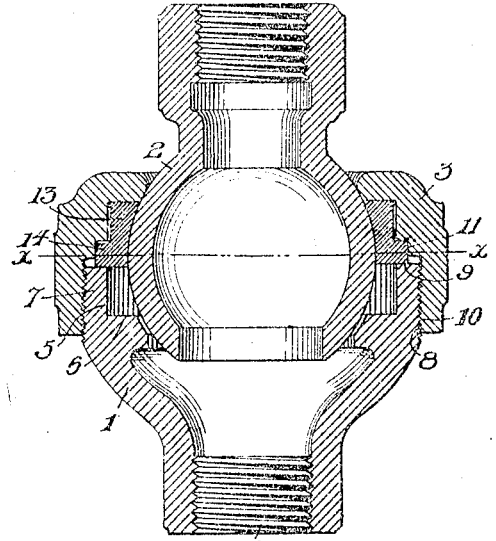
Figure 3:
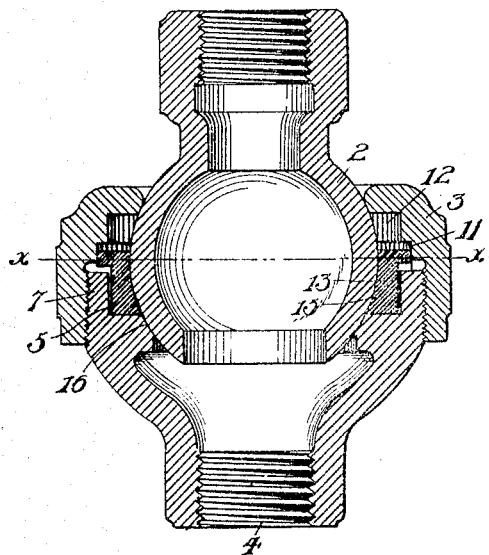
Figure 4:
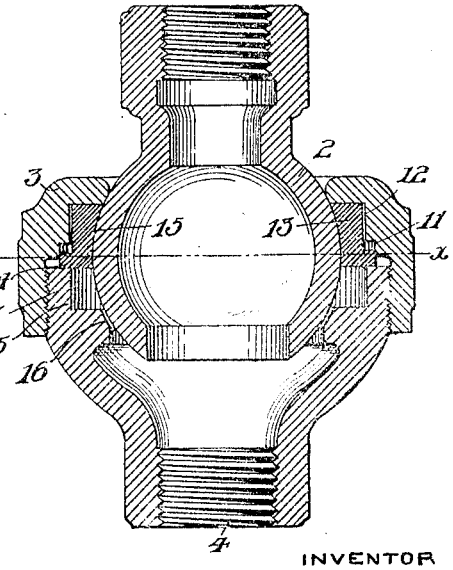

In the accompanying drawing, which illustrates applications of my invention, Figure 1 is a central vertical sectional view of a union constructed in accordance with my invention showing the union assembled for use with liquids: Fig. 2, a similar view with the bearing-ring reversed and the union assembled for use with steam: Fig. 3, a central vertical sectional view of a modified form of union with the parts assembled to constitute a "tight" union: and Fig. 4, a similar view of the modified form showing the parts assembled as a "loose" union.

Referring to the drawings, 1 designates a socket-member, 2 a ball-member, and 3 the cap or closing-member, of the flexible union.

As illustrated the socket-member comprises an internally screw-threaded nozzle 4 and is formed with an annular recess 5. Recess 5 is formed by an annular shoulder 6 and a wall 7. The upper end of the socket-member is externally threaded, as shown at 8 and is constructed with a seat 9. The hollow closing or cap-member 3 is internally screw-threaded at 10 to engage the externally threaded portion 8 of the socket-member. Cap-member 3 is formed with an irregular recess or a recess varying in diameter, the lower portion 11 being of greater diameter than the upper portion 12.

13 designates a bearing-ring. This ring is formed with an exterior annular flanged-portion 14, and a concave inner bearing-surface 15. Ring 13 constitutes a characteristic and important feature of my invention, and the function of said ring is to change the relative positions of the ball-and-socket-members of the flexible union in order to provide a "tight" joint or union, particularly adapted for use with liquids and to provide a "loose" joint, the latter being particularly adapted for use with steam.

Fig. 1 shows the parts assembled as a "tight" union and in this case the flanged-portion 14 of the bearing-ring is located in the widest portion 11 of the irregular recess of the cap-member and the remaining portion of the ring located in the annular recess of the socket-member. In the form of Fig. 2, the ring is reversed to form a "loose" union and in this instance is entirely located in the irregular recess of the cap-member. In both cases the flanged portion of the ring is located in portion 11 of the recess of the cap-member. A reversal of the ring from the position shown by Fig. 1, to the position shown by Fig. 2 raises the socket-member slightly, thereby forming a "loose" union.

In the form of Fig. 3, the socket-member is formed with a bearing-seat 16 and the ball-member in this form has its bearing on said seat 16 instead of on the bearing-surface of the ring. In order to permit of this, the flanged-portion 14 of the ring in the form of Fig. 3, is of less depth below the center line X—X than it is in the form of Fig. 1, while in Fig. 1, the flanged-portion is greater above the center line.

Particular attention is called to the fact that when the parts of the union are assembled for a "loose" union or for use with steam, the entire bearing and wear comes on the removable reversible ring.

What I claim is:

1. A flexible pipe-union comprising a ball-member, a socket-member formed with an interior annular recess, a cap-member formed with an interior annular recess varying in diameter, and a reversible flanged bearing-ring having its flanged portion located in the recess of the cap-member.

2. A flexible pipe-union comprising a ball-member, a socket-member formed with an interior annular recess, a cap-member formed with an annular recess varying in diameter, and a reversible flanged bearing-ring having its flanged portion located in the widest portion of the recess of the cap-member.

In testimony whereof I affix my signature, in presence of two subscribing witnesses.

DAVID GUY JONES.

Witnesses:
W. G. DOOLITTLE,
MARGARET HUGHES.